United States Patent
Ages

[15] 3,654,963
[45] Apr. 11, 1972

[54] ELECTRIC CONTROL VALVE

[72] Inventor: Frederik J. Ages, Rolling Hills Estates, Calif.

[73] Assignee: Honeywell Inc., Minneapolis, Minn.

[22] Filed: May 4, 1970

[21] Appl. No.: 34,226

[52] U.S. Cl. ...................137/625.65, 251/30, 137/625.44
[51] Int. Cl. .................................................F16k 31/06
[58] Field of Search ..............251/30, 129, 303; 137/625.65, 137/625.44

[56] References Cited

UNITED STATES PATENTS

| 2,774,564 | 12/1956 | Biggle | 251/30 |
| 3,263,693 | 8/1966 | Ages | 251/30 X |
| 2,874,930 | 2/1959 | Ray | 251/30 X |

FOREIGN PATENTS OR APPLICATIONS 471,427  9/1937  Great Britain .........................251/129

Primary Examiner—Arnold Rosenthal
Attorney—Lamont B. Koontz and Alan M. Staubly

[57] ABSTRACT

A relay operated valve wherein a rectangular armature is pivoted intermediate its ends on a side edge of a U-shaped magnet core near its open end and is rockable to selectively engage one or the other of two valve seats. An L-shaped leaf spring has its long leg extending generally parallel to the armature and an end thereof fixed on the valve body, with the short leg thereof extending substantially at a right angle from the other end of the long leg and into a transverse groove in the armature to yieldably pivot the armature away from the magnet and into engagement with one of the valve seats and to operably hold the armature in the valve.

1 Claim, 3 Drawing Figures

PATENTED APR 11 1972 3,654,963

INVENTOR.
FREDERIK J. AGES
BY
Alan M. Staubly
ATTORNEY.

ELECTRIC CONTROL VALVE

The invention relates to diaphragm gas valves, and more particularly to a control valve for the diaphragm valve. Valves of this general nature are well-known in the art, and the novelty in this invention lies primarily in the actuating mechanism for a so-called three-way valve that controls the supply of gas to the pressure chamber of the diaphragm valve and the bleeding of gas from said chamber.

Figure 1:
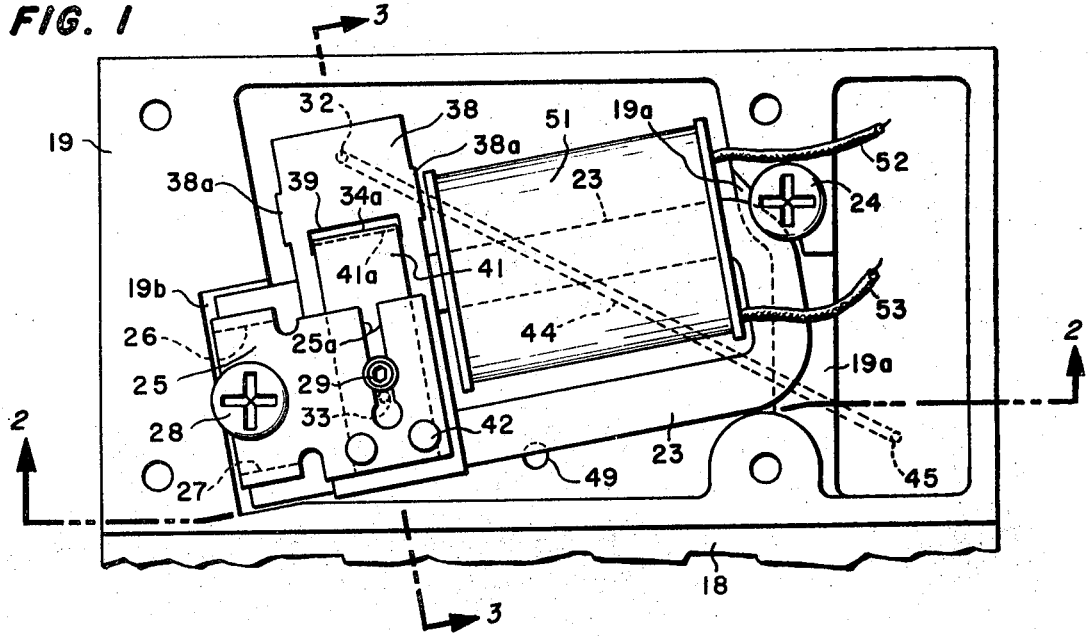
Figure 2:
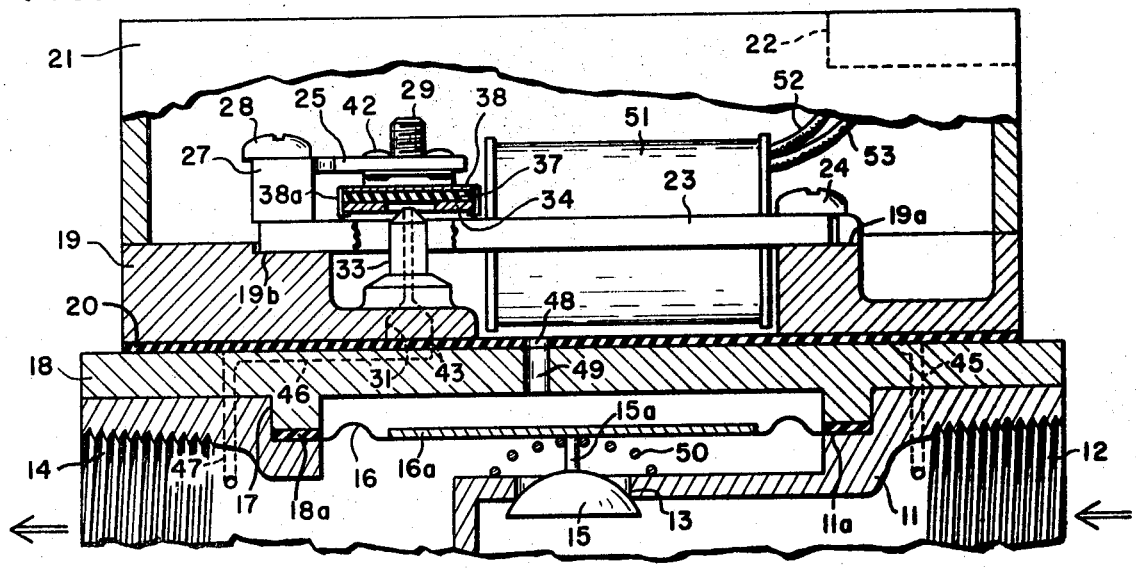
Figure 3:
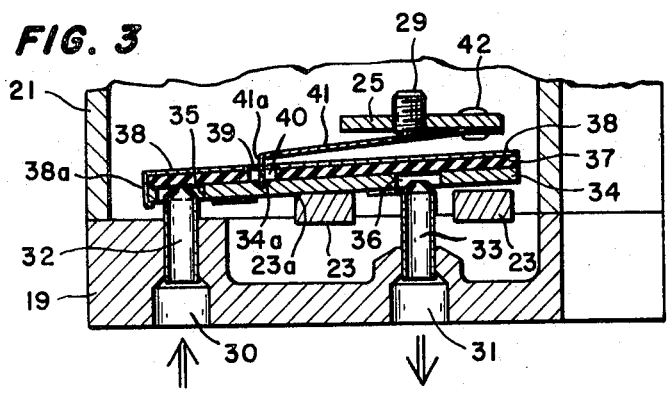

FIG. 1 of the drawing is a top view of the control valve mounted on a diaphragm valve, a portion of which is broken away and with the cover of the control valve removed;

FIG. 2 of the drawing is a fragmentary side cross-sectional view through the control valve and a portion of the diaphragm valve controlled thereby, taken along line 2—2 of FIG. 1; and FIG. 3 is a fragmentary cross-sectional view taken along line 3—3 of FIG. 1.

Referring to FIG. 2 of the drawing, the diaphragm valve comprises a body portion 11, having a threaded inlet 12, a valve seat 13, and a threaded outlet 14. A main valve 15, is connected by stem 15a to a diaphragm plate 16a, which, in turn, is mounted on a diaphragm 16. The diaphragm is clamped to the bottom of a recess 17 in the body 11 by means of a gasket 18a and cover plate 18 and by means of bolts (not shown).

The control valve has a body portion 19 that is adapted to be bolted to a cover plate 18 by means of bolts (not shown), with a sealing gasket 20 therebetween. The body portion 19 has a recess therein shaped to provide a supporting shoulder 19a near one end thereof and a second supporting shoulder 19b near the other end thereof. A U-shaped magnet core 23 has the closed end thereof clamped to the shoulder 19a by means of a bolt 24 and the open end thereof clamped to the shoulder 19b by means of a bracket 25. The bracket has downwardly extending fingers 26 and 27 that engage the two ends of the core 23 and are held by means of bolt 28. The bracket also has an extension that extends generally parallel to the magnet core and is slotted at 25a to provide a pair of adjustment screw clamping fingers between which an adjustment screw 29 extends.

The base 19 of the control valve, as shown in FIG. 3, has two stepped bores 30 and 31 therein extending upwardly from the bottom surface thereof into the top recess. At their upper ends are tubes 32 and 33, which are formed at their upper ends into valve seats. An armature 34, of generally rectangular shape, is pivoted intermediate its ends on the edge of one of the legs of the core 23 and has an opening 35 therein near one end that cooperates with the upper end of tube 32, and an opening 36 near the other end that receives the upper end of tube 33. A generally rectangular sheet of soft rubber or other suitable valve head material 37 is clamped to the upper surface of the armature by means of a suitable clip 38. The clip and rubber sheet 37 are apertured at 39 and 40, respectively, to receive the downwardly extending arm 41a of a leaf spring 41. The leaf spring is also generally rectangular in shape and has the end away from the downwardly extending arm riveted to the bracket 25 by means of a pair of rivets 42. The lower end of the arm 41a of the leaf spring extends into a rectangular or non-round groove 34a in the upper surface of the armature 34, with the groove being only slightly longer than the width of the leaf spring arm so that the armature 34 is prevented from moving either rectilinearly or rotatably in the plane of the armature, but is capable of being pivoted about the edge of the magnet core. By adjusting the screw 29 upwardly or downwardly in the bracket 25, the amount of tension in the leaf spring against the armature 34 may be varied.

As shown in FIG. 1, the tube 32 communicates through the bore 30 in the valve body 19, through an opening in the gasket 20, a groove 44 in the upper surface of the plate 18 and through a vertical bore 45 in the body 11 with the inlet 12. The tube 33 communicates through the bore 31 with the outlet 14 by means of an opening 43 in the gasket 20 and a groove 46 formed in the upper surface of the plate 18 and a bore 47 through the valve body 11. The recess in the body 19 also communicates through openings 48 in gasket 20 and 49 in body 18 with the pressure chamber above the diaphragm 16. It is thus seen that the gas can flow from the inlet 12 through the bore 45, through groove 44 to the valve seat tube 32 and, when that seat is uncovered, into recess in the valve body 19 and through openings 48 and 49 to the diaphragm chamber. When the armature is in the position shown in FIG. 3 of the drawing, gas is free to move from the diaphragm chamber out through openings 49 and 48, out tube 33, through groove 46, and through bore 47 to the outlet 14. When the gas pressure above the diaphragm is atmospheric, spring 50 will move the diaphragm upwardly and position valve 15 against the valve seat 13.

To provide means for moving the armature clockwise about the edge of the armature core, a coil 51 is preferably mounted on one of the legs of the core and is adapted to be energized by a low voltage and small amperage power source, such as by a thermopile.

The coil 51 is adapted to be connected to a room thermostat and to a low voltage power source (thermopile) through leads 52 and 53 and, if desired, through a terminal block 22 (see FIG. 1). A closing of the room thermostat will cause energization of the coil and cause the armature 34 to pivot in a clockwise direction, as viewed in FIG. 3, to uncover the valve seat tube 32 and close the valve seat tube 33, thus sealing off the diaphragm chamber from the outlet and opening the passageway from the inlet to the diaphragm chamber. This will permit a buildup of gas pressure in the chamber above the diaphragm and move the valve 15 to its open position. Deenergization of the magnet, by breaking the circuit at the room thermostat, will cause or permit the leaf spring 41 to rock the armature counterclockwise, opening valve seat 33 and closing valve seat 32. This permits the spring 50 to expel gas from the diaphragm chamber and close the valve 15.

From the above description of the invention, it is obvious that a very inexpensive, easy-to-assemble and light-weight control valve construction has been provided that will enable a diaphragm valve to be controlled by a minimum of electrical energy. The number of parts have been reduced from what is normally present in a control valve of this type of having the leaf spring, which biases the controller valve head in opposition to the electrical power operated means for operating the valve, serve the additional functions of positioning and holding the valve head.

The embodiments of the invention in which an exclusive property or right is claimed are defined as follows:

1. An electric control valve for a pressure operable valve comprising a valve body having a cavity therein, a magnet core mounted in said cavity, a wire coil on said core, a substantially straight and elongated armature having a non-round recess in one side thereof and having first and second valve means thereon at opposite ends thereof and being pivoted intermediate its ends on the opposite side thereof on an edge of said core with one portion of the armature being located near and attractable by said core when the coil is energized, a first valve seat positioned to be engaged by said first valve means when the coil is energized and spaced therefrom when the coil is de-energized, a second valve seat positioned to be engaged by said second valve means when said coil is de-energized and to be spaced therefrom when said coil is energized, an elongated leaf spring rigidly secured at one of its ends to said valve body and having its longitudinal axis extending generally parallel to the longitudinal axis of said armature, and having a transversely extending non-round arm at its other end engaging in said recess in said armature so as to position the armature with respect to said core and valve and to normally bias said second valve means into engagement with said second valve seat, but being yieldable upon energization of said coil to enable said armature to move said second valve means away from said second valve seat and to move said first valve means against said first valve seat, said non-round arm and recess in the armature being the sole means for preventing rotary movement of said armature about the arm axis which is perpendicular to the recess side of said armature.